Patented Dec. 16, 1952

2,622,072

UNITED STATES PATENT OFFICE 2,622,072

PREPARATION OF POLYSILOXANE RESINS BY HYDROLYSIS OF HALOSILANES IN CONTACT WITH METHYLENE CHLORIDE

Arthur F. Gordon, Midland, Mich., assignor to Dow Corning Corporation, Midland, Mich., a corporation of Michigan No Drawing. Application June 8, 1950, Serial No. 166,980

10 Claims. (Cl. 260—46.5)

The present invention relates to improved methods for the preparation of polysiloxane resins.

A wide variety of procedures have heretofore been proposed for the preparation of organosiloxane resins from organochlorosilanes. A common proposal has been the use of ice to effect hydrolysis of ether solutions of the chlorosilanes. The use of either ice or ether on a commercial scale is entirely impractical.

Another method, which has been extensively used commercially, is to prepare an aromatic solvent solution of the chlorosilanes and to add this solution to water, which may be mixed with additional aromatic solvent for dissolving the hydrolysis product. Other methods have been proposed which call for a plurality of solvents, higher aliphatic alcohols in the hydrolysis medium, the use of mutual solvents such as dioxane and the diethers of ethylene and diethyl glycol, or partial hydrolysis techniques.

The earlier methods had as a principal object the prevention of gel formation during hydrolysis, particularly in systems which were rich in monoorganotrichlorosilanes. As the art advanced, however, it became apparent that the physical properties of an organosiloxane resin could be varied not only by its formulation, but also by the particular method of preparation.

Although various hydrolysis methods described above were claimed to improve certain properties of the resinous product, they were found to have specific disadvantages. Improvement in some property of the final resin was usually obtained at the expense of other desirable properties. For instance, the hardness of the resin might be improved but its flexibility impaired, or cure time sacrificed for craze resistance and yield. Also, such economic factors as large volumes of solvents, expense of solvents, or poor recovery of solvents made some of these methods impractical. Furthermore, when the silane mixture being hydrolyzed contained a substantial percentage of monomethyltrichlorosilane, it was often necessary to react the silane mixture with alcohol prior to hydrolysis in order to avoid the formation of excessive insoluble material, thus adding an additional expensive step to the method.

Prior hydrolysis methods, moreover, have failed to substantially improve the weight loss characteristics of the solvent free resin at elevated temperatures. This may be due to the resin's containing a relatively high percentage of low molecular weight, completely condensed organosiloxane. In many applications, it is extremely important that a thermosetting resin have a minimum high temperature weight-loss.

Objects of the present invention are to provide improved methods for the preparation of organosiloxane resins; to provide methods for the production of organosiloxane resins of improved flexibility, improved shelf life, and of comparatively high solution viscosity; to provide methods for the production of resins of low weight loss at elevated temperatures and which are capable of being spray-dried to a solvent-free powder; and to provide methods for the production of organosilicon resins which contain substantial percentages of monomethylsilsesquioxane, in which it is unnecessary to partially convert the organosilanes to alkoxy silanes prior to their addition to the hydrolysis medium.

In accordance with the present invention, a mixture of hydrolyzable organosilanes is hydrolyzed by reacting the organosilanes with water in contact with methylene chloride, $CH_2Cl_2$.

The silane mixture which is hydrolyzed in accordance herewith contains an average of from 1.0 to 1.8 organic radicals of the group consisting of alkyl and monocyclic aryl radicals, bonded to silicon by carbon to silicon linkage, per silicon atom. The silanes have the general formula $R_nSiX_{4-n}$, where each R is a radical selected from the group consisting of alkyl and monocyclic aryl radicals, $n$ is an integer of from 1 to 2, and each X represents a radical of the group consisting of chlorine and alkoxy radicals. It is preferable that from 20 to 95 mol per cent of the silane mixture consist of a monoalkyl silane having the general formula $R'SiX_3$, where $R'$ is an alkyl radical.

Examples of the preferred silanes of this invention are methyltrichlorosilane, ethyltrichlorosilane, phenyltrichlorosilane, chlorophenyltrichlorosilane, trifluoromethylphenyltrichlorosilane, diphenyldichlorosilane, phenylmethyldichlorosilane, dimethyldichlorosilane, and the alkoxy derivatives of the above compounds, particularly the ethoxy and isopropoxy derivatives.

A quantity of water sufficient for the complete hydrolysis of the silanes should be employed. Preferably, when the mixture contains chlorosilanes, sufficient water is used to dissolve the hydrogen chloride formed by hydrolysis, and to produce a solution thereof in the excess water of a concentration less than 35 per cent by weight HCl.

The methylene chloride is preferably employed in an amount to yield a solution of siloxane in the methylene chloride of a concentration between 10 and 60 per cent by weight of the siloxane resin. The methylene chloride may be used in mixture with the silanes and this solution of silanes added to the water. Alternatively, the methylene chloride may be mixed with the water and the silanes added to the mixture so formed, or a portion of the methylene chloride employed may be used to dilute the silanes and the remainder used in mixture with the water.

When the silane mixture contains any substantial amount of a diphenyl substituted silane such as $(C_6H_5)_2SiCl_2$, or when the mixture contains an average of less than 1.25 organic radicals bonded to silicon per silicon atom, it is preferable to employ a lower aliphatic monohydric alcohol, such as ethyl, propyl, isopropyl, or butyl alcohol, in the hydrolysis medium. If desired, the alcohol may be added to the silane mixture to convert the silane partially to alkoxy silane prior to hydrolysis. In order to simplify the processing steps, however, it is preferable to add the alcohol to the hydrolysis medium. The alcohol is customarily employed, in systems of the type described, in an amount equivalent to more than 20 mol per cent of the chlorine present in the silane mixture, the preferred range being from 33 to 67 mol per cent.

When the process of this invention is used with certain mixtures of silanes, a resin solution is obtained which is capable of being spray-dried, thus economically producing a solvent-free powdered resin which maintains the desirable properties of the conventional resin heretofore marketed as a solution. Such solvent-free powders are highly desirable for certain molding operations and for the economic saving in the transportation of the product.

The mixture of silanes which, when hydrolyzed in contact with methylene chloride, gives resin solutions capable of being spray-dried is comprised of (1) from 25 to 75 mol per cent $CH_3SiX_3$, (2) from 10 to 45 mol per cent $C_6H_5SiX_3$, (3) from 0 to 33 mol per cent $(CH_3)_2SiX_2$, (4) from 0 to 15 mol per cent $C_6H_5CH_3SiX_2$, and (5) from 0 to 20 mol per cent $(C_6H_5)_2SiX_2$, where X is a radical from the group consisting of chlorine and alkoxy radicals, the sum of (1) and (2) being at least 65 mol per cent of the mixture.

The spray-drying may be carried out in any conventional equipment in which the solvent is rapidly removed from an atomized spray of the resin solution, and the resulting powder collected. The spray-drying is carried out at a temperature above the boiling point of methylene chloride, preferably at a temperature ranging from 120° to 190° F. The temperature at which the spray drying is accomplished should be kept below the point at which any substantial curing or polymerization of the resin would be encountered.

The organosiloxane resins produced in accordance herewith are of the same utility as the commercially known siloxane resins. They may be employed for the production of moldings by heating under pressure, preferably with a filler, and they are likewise of use for protective coatings. Their comparatively low weight loss characteristics are of particular importance in many applications in which long exposure at an elevated temperature is encountered, hence, they are of utility in applications in which prior organosiloxane resins, with otherwise desirable properties, were not acceptable. Certain of the resins produced in accord with the present invention are also capable of being spray-dried to a solvent-free powder. So far as is known, prior methods have failed to successfully achieve this result.

The following examples illustrate specific embodiments of the invention, but are not to be construed as limiting the scope thereof.

*Example 1*

An equimolar mixture was prepared of 423 grams of phenyltrichlorosilane, 258 grams of dimethyldichlorosilane, and 299 grams methyltrichlorosilane. A hydrolysis mixture was prepared of 1004 grams of methylene chloride and 2332 grams of water. The silane mixture was added to the hydrolysis mixture over a period of 48 minutes at a temperature ranging from 33° to 36° C. The reaction mixture was stirred for an additional 30 minutes and decanted. The resin solution was stirred for 30 minutes with 25 grams of precipitated calcium carbonate, 1 ml. of water, and 1 ml. of methyl alcohol. It was then stirred for an additional 30 minutes with 10 grams of anhydrous sodium sulfate, following which it was filtered. The solvent was distilled off to a resin concentration of 57.5 per cent. The yield of resin obtained was 96.2 per cent of theoretical. A sample of the resin was heated in a relatively thin layer at 130° C. for one hour to drive off solvent. It was then weighed and heated at 250° C. for 3 hours. The weight loss was 2.4 per cent. After 27 hours at 250° C. the weight loss was 2.6 per cent.

As a comparison, when the above hydrolysis is duplicated in all details except that toluene is used rather than methylene chloride, the solvent free product has a weight loss of about 6.0 per cent after 3 hours at 250° C.

*Example 2*

A mixture was prepared of 313.8 grams of methyltrichlorosilane, 216.5 grams dimethyldichlorosilane, and 469.2 grams of phenyltrichlorosilane (molar ratio of 35:28:37). A hydrolysis mixture was prepared of 2382 grams of water and 1026 grams of methylene chloride. The mixture of silanes was added to the hydrolysis mixture over a period of 54 minutes at a temperature ranging from 18° to 36° C. The reaction mixture was stirred for an additional 30 minutes and decanted. The resin solution was stirred for 30 minutes with 25 grams of precipitated calcium carbonate, 1 ml. water, and 1 ml. of methyl alcohol. It was then stirred for an additional 30 minutes with 10 grams of anhydrous sodium sulfate, and filtered. The solvent was distilled off to 53.4 per cent solids. A solvent-free sample showed a 2.5 per cent weight loss after three hours at 250° C. and only 2.6 per cent weight loss after 27 hours at 250° C. A portion of this resin was spray-dried to yield a solvent-free powder.

*Example 3*

A mixture was prepared of 448.5 grams methyltrichlorosilane, 258 grams dimethyldichlorosilane, and 211.5 grams of phenyltrichlorosilane (a molar ratio of 50:33:17). A hydrolysis mixture was prepared of 2333 grams of water and 891 grams of methylene chloride. The silane mixture was added to the hydrolysis mixture over a period of 50 minutes at a temperature of less than 30° C. The reaction mixture was stirred for an additional 60 minutes, decanted, neutralized, filtered, and concentrated as in Examples 1 and 2. The yield of resin obtained was 93 per cent of theoretical. A solvent-free sample showed a 5.8 per cent weight loss after 3 hours at 250° C.

As a comparison, the same run was repeated in every detail except that diethyl ether was used in place of methylene chloride. A yield of 77.2 per cent of theoretical was obtained and the three hour weight loss at 250° C. of a solvent-free sample was 11.8 per cent.

*Example 4*

A mixture was prepared of 373.5 grams of methyltriethoxysilane, 248.5 grams of dimethyldiethoxysilane, and 469.2 grams of phenyltrichlorosilane (a molar ratio of 35:28:37). A hydrolysis mixture was prepared of 1938 grams of water and 1026 grams methylene chloride. The silane mixture was added to the hydrolysis mixture at a temperature ranging from 35° to 39° C. The reaction mixture was stirred for an additional two hours and decanted. The resin solution was stirred for 30 minutes with 30 grams of calcium carbonate, 30 ml. of methanol and 1 ml. of water. It was then stirred for 30 minutes with 10 grams of anhydrous sodium sulfate and filtered. The major portion of the methylene chloride was distilled off and the resin diluted to 57.3 per cent solids with toluene. A solvent-free sample of this resin showed a 2.6 per cent weight loss after three hours at 250° C.

*Example 5*

An equimolar mixture of 299 grams of methyltrichlorosilane, 258 grams dimethyldichlorosilane, and 423 grams of phenyltrichlorosilane was added to a hydrolysis mixture of 1004 grams of methylene chloride, 5200 grams of water and 92 grams of ethanol at a temperature of less than 30° C. The resin solution was decanted, neutralized, filtered, and the solvent distilled off to a resin concentration of 50.5 per cent solids. A solvent-free sample of this resin showed a 250° C. three hour weight loss of 2.4 per cent. After 27 hours at 250° C. the weight loss was 2.9 per cent.

*Example 6*

A mixture was prepared of 313.8 grams methyltrichlorosilane, 630 grams of phenylmethyldichlorosilane, and 126.8 grams of phenyltrichlorosilane (molar ratio of 35:55:10). This mixture was added to a hydrolysis mixture of 2630 grams of water and 1070 grams methylene chloride at a temperature ranging from 24° to 40° C. The resin solution was decanted, neutralized, filtered, and the solvent distilled off. The resin was further polymerized by heating it at 150° to 180° C. for 8 hours. It was then diluted with xylene to 49 per cent resin concentration. The acid number of this solution was nil. A yield of 91 per cent of theoretical was obtained.

*Example 7*

A mixture of 598 grams of methyltrichlorosilane and 423 grams of phenyltrichlorosilane (molar ratio of 67:33) was added to a hydrolysis mixture of 975 grams of methylene chloride, 360 grams of isopropanol, and 1750 grams of water at a temperature ranging from 18° to 39° C. The reaction mixture was then stirred for 15 minutes and decanted. The resin solution was stirred for 30 minutes with 50 grams of precipitated calcium carbonate and the solution filtered. The solvent was distilled off to yield a resin solution of 61.4 per cent solids, having a viscosity of 265 centipoises. The yield obtained was 97.4 per cent of theoretical. The weight loss on a sample of the solvent-free resin at 250° C. was 2.6 per cent after three hours, 2.9 per cent after 27 hours, and 3.4 per cent after 200 hours. The solvent was distilled off to yield a solid resin which contained 4 per cent by weight of hydroxyl.

*Example 8*

A mixture of 59.2 pounds of methyltrichlorosilane, 42.0 pounds phenyltrichlorosilane, and 32.0 pounds of methylene chloride was added to a hydrolysis mixture of 188.7 pounds of water, 65 pounds of methylene chloride, and 71.3 pounds of isopropanol at a temperature of from 19° to 32° C. The neutralized, filtered resin represented 98.5 per cent of the theoretical yield and had an acid number of 0.07. This resin solution was spray-dried in a laboratory spray-drier to yield a solvent-free powder. The spray-drier used operated with a high speed air driven centrifugal atomizer located at the top and center of a drying chamber. Heated air was forced into the spray-drier to remove the solvent and to force the dried material into a high velocity collector funnel. The atomizer was operated at 50,000 R. P. M., and the temperature of the air at the inlet was 190° F.

*Example 9*

A mixture of 540 grams of methyltrichlorosilane, 60 grams of dimethyldichlorosilane, and 140 grams of methylene chloride was added to a hydrolysis mixture of 276 grams of methylene chloride, 470 grams of isopropanol, and 1715 grams of water at a temperature of from 16° to 29° C. The reaction mixture was stirred for an additional 15 minutes and decanted. No insoluble material was present. The resin solution was stirred for 1 hour with 50 grams for calcium carbonate and filtered. The yield obtained was 89.5 per cent of theoretical. A solvent-free sample showed a 4.6 per cent weight loss after being heated at 250° C. for three hours. As a comparison, a similar run was made in which toluene was used rather than methylene chloride. A yield of only 60.7 per cent of theoretical was obtained.

*Example 10*

A mixture of 956 grams of methyltrichlorosilane and 206.3 grams of dimethyldichlorosilane was added to a hydrolysis mixture of 1017 grams of methylene chloride, 448 grams of isopropanol, and 2005 grams of water at a temperature of less than 35° C. The reaction mixture was treated as in Example 9 and a yield of 82.0 per cent of theoretical was obtained. The acid number of the resin was nil and the weight loss of the solvent-free resin after three hours at 250° C. was 9.8 per cent.

*Example 11*

A mixture of 956 grams of methyltrichlorosilane and 305.5 grams phenylmethyldichlorosilane was added to a hydrolysis mixture of 1085 grams of water, 895 grams of isopropanol, and 1200 grams of methylene chloride at a temperature ranging from 22° to 39° C. The reaction mixture was stirred for an additional 5 minutes and decanted. The resin solution was stirred for 15 minutes with 25 grams of calcium carbonate and then for 30 minutes with 15 grams of sodium sulfate. The solution was filtered and the solvent distilled off to a resin concentration of 58.1 per cent solids. The yield obtained was 95.1 per cent of theoretical.

*Example 12*

A mixture of 747 grams of methyltrichlorosilane and 253 grams of diphenyldichlorosilane was added to a hydrolysis mixture of 1750 grams of water, 990 grams of methylene chloride, and 300 grams of isopropanol at a temperature of from 12° to 33° C. It was stirred for an additional 10 minutes and decanted. No insoluble solids were produced. The resin solution was stirred for 30 minutes with 50 grams of calcium carbonate and for an additional 30 minutes with 10 grams of anhydrous sodium sulfate. It was then filtered and concentrated to 58.4 per cent siloxane by weight. The yield obtained was 88.7 per cent of theoretical and the acid number was 0.095. The weight loss at 250° C. was 7.4 per cent after three hours and 9.0 per cent after 200 hours.

Example 13

An equimolar mixture of 253 grams of diphenyldichlorosilane, 129 grams of dimethyldichlorosilane, and 149.5 grams of methyltrichlorosilane was added to a hydrolysis mixture of 630 grams of methylene chloride, 180 grams of isopropanol, and 1002 grams of water at a temperature of from 29° to 36° C. The mixture was stirred an additional 30 minutes with 25 grams of calcium carbonate and for an additional 15 minutes with 10 grams of anhydrous sodium sulfate. The resin solution was filtered and the solvent was distilled off at room temperature under vacuum. The solid resin so prepared was completely soluble in toluene. The weight loss of the solvent-free resin after 3 hour at 250° C. was 9.5 per cent.

Example 14

A mixture of 149.5 grams of methyltrichlorosilane, 65.5 grams of dimethyldichlorosilane, 211.5 grams of phenyltrichlorosilane, and 126.5 grams of diphenyldichlorosilane (molar ratio of 33:17:33:17) was added to a hydrolysis mixture of 160 grams of isopropanol, 1168 grams of water, and 617 grams of methylene chloride at a temperature of from 32° to 35° C. The reaction mixture was stirred for an additional 30 minutes and decanted. The resin solution was then stirred for 30 minutes with 25 grams of calcium carbonate and filtered. All of the methylene chloride was distilled off and the resin was heated for three hours at 160° to 175° C. It was then diluted with xylene and filtered. The 53.8 per cent resin solution obtained represented a yield of 94.8 per cent of theoretical, and had an acid number of nil. The solvent-free resin showed a weight loss of 5.9 per cent after three hours at 250° C.

That which is claimed is:

1. The method of making a polysiloxane resin from a mixture of hydrolyzable organosilanes containing an average of from 1.0 to 1.8 inclusive organic radicals bonded to silicon per silicon atom, the individual members of the mixture having the general formula $R_nSiX_{4-n}$, where each R is a radical selected from the group consisting of alkyl and monocyclic aryl radicals, $n$ is an integer of from 1 to 2, and each X represents a radical of the group consisting of chlorine and alkoxy radicals, which comprises hydrolyzing the mixture with water in contact with methylene chloride, said methylene chloride being present in an amount sufficient to form a solution of less than 60 per cent by weight of the polysiloxane resin formed and said water being present in a quantity at least sufficient for the complete hydrolysis of the silanes.

2. The method of making a polysiloxane resin which comprises hydrolyzing with water a mixture of organosilanes, said mixture being comprised of from 20 to 95 mol per cent of an organosilane having the general formula $R'SiX_3$, where R' represents an alkyl radical and X represents a radical selected from the group consisting of chlorine and alkoxy radicals, the remainder of the mixture being comprised of an organosilane having the general formula $R_nSiX_{4-n}$, where each R is a radical selected from the group consisting of alkyl and monocyclic aryl radicals in which R and R' are different radicals, $n$ is an integer of from 1 to 2 and each X is as defined above, in contact with an amount of methylene chloride sufficient to form a solution of less than 60 per cent by weight of the polysiloxane resin formed, the amount of water used being present in a quantity at least sufficient for the complete hydrolysis of the silanes.

3. The method of making a polysiloxane resin which comprises hydrolyzing with water a mixture of organosilanes, said mixture being comprised of from 20 to 95 mol per cent of an organosilane having the general formula $R'SiX_3$, where R' represents an alkyl radical and each X represents a radical selected from the group consisting of chlorine and alkoxy radicals, the remainder of the mixture being comprised of an organosilane having the general formula $R_nSiX_{4-n}$, where each R is a radical selected from the group consisting of alkyl and monocyclic aryl radicals in which R and R' are different radicals, $n$ is an integer of from 1 to 2 and each X is as defined above, in contact with an amount of methylene chloride sufficient to form a solution of less than 60 per cent by weight of the polysiloxane resin formed, in a hydrolysis medium comprised of water and a monohydric aliphatic alcohol of from two to four carbon atoms, said alcohol being present in an amount equivalent to more than 20 mol per cent of the chlorine present in the silane mixture and said water being present in a quantity at least sufficient for the complete hydrolysis of the silanes.

4. The method of making a polysiloxane resin from a mixture of hydrolyzable organosilanes capable of forming a resin upon hydrolysis and condensation, said mixture of hydrolyzable organosilanes consisting of from 20 to 95 mol per cent of $CH_3SiX_3$, where each X represents a radical selected from the group consisting of chlorine and alkoxy radicals of from 2 to 3 carbon atoms, the remainder of the organosilanes having the general formula $(C_6H_5)_a(CH_3)_bSiX_{4-a-b}$, where $a$ and $b$ are integers of from 0 to 2 inclusive, the sum of $a+b$ being an integer of from 1 to 2 inclusive and where $a$ is 0, $b$ is 2 and each X is as defined above, which comprises hydrolyzing the mixture with water in contact with methylene chloride, said methylene chloride being present in an amount sufficient to form a solution of less than 60 per cent by weight of the polysiloxane resin formed and said water being present in a quantity at least sufficient for the complete hydrolysis of the silanes.

5. The method of making a polysiloxane resin which comprises hydrolyzing with water a mixture of organosilanes comprising from 25 to 60 mol per cent $CH_3SiCl_3$, 10 to 45 mol per cent $C_6H_5SiCl_3$, and 25 to 40 mol per cent $$CH_3(CH_3)_c(C_6H_5)_{1-c}SiCl_2$$

where $c$ is an integer from 0 to 1 inclusive, in contact with an amount of methylene chloride sufficient to form a solution of less than 60 per cent by weight of the polysiloxane resin formed, the amount of water used being present in a quantity at least sufficient for the complete hydrolysis of the silanes.

6. The method of making a polysiloxane resin which comprises hydrolyzing a mixture of from 55 to 75 mol per cent $CH_3SiCl_3$ and 25 to 45 mol per cent $C_6H_5SiCl_3$, in contact with an amount of methylene chloride sufficient to form a solution of less than 60 per cent by weight of the polysiloxane resin formed, in a hydrolysis medium comprising a quantity of water in excess of that calculated as necessary for complete hydrolysis of the mixture and a monohydric aliphatic alcohol of from 2 to 4 carbon atoms, said alcohol being present in an amount equivalent to more than 20 mol per cent of the chlorine present in the silane mixture.

7. The method of making a polysiloxane resin which comprises hydrolyzing a mixture of from 70 to 95 mol per cent $CH_3SiCl_3$ and from 5 to 30 mol per cent $CH_3(CH_3)_c(C_6H_5)_{1-c}SiCl_2$, where $c$ is an integer of from 0 to 1 inclusive, in contact with an amount of methylene chloride sufficient to form a solution of less than 60 per cent by weight of the polysiloxane resin formed, in a hydrolysis medium comprised of a quantity of water in excess of that calculated as necessary for complete hydrolysis of the mixture and a monohydric aliphatic alcohol of from 2 to 4 carbon atoms, said alcohol being present in an amount equivalent to more than 20 mol per cent of the chlorine present in the silane mixture.

8. The method of making a polysiloxane resin comprising hydrolyzing a mixture of from 20 to 80 mol per cent $CH_3SiCl_3$, from 5 to 40 mol per cent $(C_6H_5)_2SiCl_2$, and from 10 to 40 mol per cent $CH_3(CH_3)_c(C_6H_5)_{1-c}SiCl_2$, where $c$ is an integer of from 0 to 1 inclusive, in contact with an amount of methylene chloride sufficient to form a solution of less than 60 per cent by weight of the polysiloxane resin formed, in a hydrolysis medium comprised of a quantity of water in excess of that calculated as necessary for complete hydrolysis of the mixture and a monohydric aliphatic alcohol of from 2 to 4 carbon atoms, said alcohol being present in an amount equivalent to more than 20 mol per cent of the chlorine present in the silane mixture.

9. The method of making a polysiloxane resin which comprises hydrolyzing a mixture of from 25 to 85 mol per cent $CH_3SiCl_3$, 5 to 40 mol per cent $(CH_3)_2SiCl_2$, 5 to 40 mol per cent $C_6H_5SiCl_3$, and 5 to 30 mole per cent $(C_6H_5)_2SiCl_2$, in contact with an amount of methylene chloride sufficient to form a solution of less than 60 per cent by weight of the polysiloxane resin formed, in a hydrolysis medium comprised of a quantity of water in excess of that calculated as necessary for complete hydrolysis of the mixture and a monohydric alphiatic alcohol of from 2 to 4 carbon atoms, said alcohol being present in an amount equivalent to more than 20 mol per cent of the chlorine present in the silane mixture.

10. The method of making a solvent-free powdered organosiloxane resin which comprises hydrolyzing with water a mixture of (1) from 25 to 75 mol per cent $CH_3SiX_3$, (2) from 10 to 45 mol per cent $C_6H_5SiX_3$, (3) from 0 to 33 mol per cent $(CH_3)_2SiX_2$, (4) from 0 to 15 mol per cent $C_6H_5CH_3SiX_2$, and (5) from 0 to 20 mol per cent $(C_6H_5)_2SiX_2$, where X is a radical selected from the group consisting of chlorine and alkoxy radicals, the sum of (1) and (2) being at least 65 mol per cent of the mixture, in contact with an amount of methylene chloride sufficient to form a solution of less than 60 per cent by weight of the polysiloxane resin formed, the amount of water used being present in a quantity at least sufficient for the complete hydrolysis of the silanes, and removing the solvent from an atomized spray of the resin solution so formed at a temperature above the boiling point of methylene chloride.

ARTHUR F. GORDON.

REFERENCES CITED

The following references are of record in the file of this patent:

UNITED STATES PATENTS

| Number | Name | Date |
|---|---|---|
| 2,381,002 | Patnode | Aug. 7, 1945 |
| 2,398,672 | Sauer | Apr. 16, 1946 |
| 2,470,479 | Ferguson et al. | May 17, 1949 |
| 2,483,373 | Rochow | Sept. 27, 1949 |
| 2,521,673 | Britton et al. | Sept. 12, 1950 |